(12) United States Patent
Yngve et al.

(10) Patent No.: US 8,498,775 B2
(45) Date of Patent: Jul. 30, 2013

(54) LINEAR AND NON-LINEAR IDENTIFICATION OF THE LONGITUDINAL TIRE-ROAD FRICTION COEFFICIENT

(75) Inventors: Simon Yngve, Gothenburg (SE); Youssef A. Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 388 days.

(21) Appl. No.: 12/987,483

(22) Filed: Jan. 10, 2011

(65) Prior Publication Data

US 2012/0179327 A1 Jul. 12, 2012

(51) Int. Cl.
*G01N 19/02* (2006.01)
*B60W 40/06* (2012.01)

(52) U.S. Cl.
USPC .................................. 701/32.9; 701/80; 73/9

(58) Field of Classification Search
USPC ......................................................... 701/32.9
See application file for complete search history.

(56) References Cited

U.S. PATENT DOCUMENTS

| | | | |
|---|---|---|---|
| 6,222,334 B1 | 4/2001 | Tamagawa et al. | |
| 6,508,102 B1 | 1/2003 | Margolis et al. | |
| 7,143,855 B2* | 12/2006 | Hopper | 180/247 |
| 8,078,351 B2* | 12/2011 | Nardi et al. | 701/29.1 |
| 2003/0154012 A1* | 8/2003 | Anwar | 701/71 |
| 2005/0230172 A1* | 10/2005 | Hopper | 180/247 |
| 2006/0253243 A1 | 11/2006 | Svendenius et al. | |
| 2007/0061061 A1* | 3/2007 | Salman et al. | 701/80 |
| 2008/0109133 A1* | 5/2008 | Bedner et al. | 701/41 |
| 2008/0109134 A1* | 5/2008 | Bolourchi et al. | 701/41 |
| 2008/0243348 A1* | 10/2008 | Svendenius et al. | 701/90 |
| 2009/0204318 A1* | 8/2009 | Nimmo et al. | 701/124 |
| 2010/0017088 A1 | 1/2010 | Joyce | |
| 2010/0114449 A1* | 5/2010 | Shiozawa et al. | 701/90 |
| 2010/0131144 A1* | 5/2010 | Ryu et al. | 701/29 |
| 2010/0131145 A1* | 5/2010 | Ryu et al. | 701/29 |
| 2010/0131146 A1* | 5/2010 | Nardi et al. | 701/29 |
| 2010/0131165 A1* | 5/2010 | Salman et al. | 701/70 |
| 2010/0131229 A1* | 5/2010 | Nardi et al. | 702/142 |
| 2011/0106458 A1* | 5/2011 | Shiozawa et al. | 702/41 |
| 2011/0118935 A1* | 5/2011 | Shiozawa et al. | 701/35 |
| 2011/0166761 A1* | 7/2011 | Kammann et al. | 701/70 |

FOREIGN PATENT DOCUMENTS

WO 2004039621 A1 5/2004

* cited by examiner

*Primary Examiner* — Shelley Chen
(74) *Attorney, Agent, or Firm* — Quinn Law Group, PLLC

(57) ABSTRACT

A method of estimating a tire-road friction coefficient includes determining when the slope of a tire characteristic curve relating a utilized longitudinal friction of a tire to longitudinal slip of the tire is linear and non-linear. When the slope of the tire characteristic curve is linear, then the tire-road friction coefficient is estimated by correlating the slope of the tire characteristic curve to the tire-road friction coefficient. When the slope of the tire characteristic curve is non-linear, indicating that the tire is near or at saturation, then the tire-road friction coefficient is estimated by calculating a current utilized longitudinal friction of the tire.

19 Claims, 3 Drawing Sheets

LINEAR AND NON-LINEAR IDENTIFICATION OF THE LONGITUDINAL TIRE-ROAD FRICTION COEFFICIENT

TECHNICAL FIELD

The invention generally relates to a method of estimating a tire-road friction coefficient for a tire of a vehicle.

BACKGROUND

The tire-road friction coefficient is a dimensionless value indicating the friction qualities of the tire against the friction qualities of the road. Many vehicle control systems, including but not limited to electronic stability control systems and anti-lock brake systems, utilize a tire-road friction coefficient when determining how to control the various components of the vehicle. The tire-road friction coefficient changes with differing tires and differing road conditions. For example, the tire-road friction coefficient will be greater on dry pavement than on wet pavement for the same tire on the same vehicle in the same operating conditions. Because the tire-road friction coefficient is continuously changing, the vehicle controller must continuously monitor and/or calculate the road-tire friction coefficient for the various control systems to use.

SUMMARY

A method of estimating a longitudinal tire-road friction coefficient for a vehicle is provided. The method includes estimating a longitudinal stiffness of a tire, and determining if the tire is within a pre-determined range of saturation. When the tire is not within the pre-determined range of saturation, then the longitudinal stiffness of the tire is correlated to an estimated value of the tire-road friction coefficient to estimate the tire-road friction coefficient. When the tire is within the pre-determined range of saturation, then a current utilized longitudinal friction of the tire is calculated to estimate the tire-road friction coefficient.

An alternative method of estimating the longitudinal tire-road friction coefficient for a vehicle is provided. The method includes calculating a longitudinal slip of the tire over time, calculating a longitudinal force on the tire over time, calculating a vertical force on the tire over time, and calculating a utilized longitudinal friction of the tire over time. The utilized longitudinal friction of the tire is calculated by dividing the longitudinal force on the tire by the vertical force on the tire. The method further includes calculating an initial slope of a tire characteristic curve relating the utilized longitudinal friction of the tire to the longitudinal slip of the tire over time, and calculating a first derivative of the tire characteristic curve over time to determine if the tire is within a pre-determined range of saturation. When the tire is not within the pre-determined range of saturation, then the initial slope of the tire characteristic curve is correlated to an estimated value of the tire-road friction coefficient to estimate the tire-road friction coefficient. When the tire is within the pre-determined range of saturation, then a current utilized longitudinal friction of the tire is calculated to estimate the tire-road friction coefficient. The current utilized longitudinal friction of the tire is calculated by dividing a current longitudinal force on the tire by a current vertical force on the tire.

Accordingly, the initial slope of the tire characteristic curve, which relates the utilized longitudinal friction of the tire to the longitudinal slip of the tire and is a measure of the longitudinal stiffness of the tire, is used to calculate the tire-road friction coefficient when the slope of initial slope is not within the pre-determined range of saturation, i.e., so long as the slope of the tire characteristic curve remains linear. When the slope of the tire characteristic curve enters the pre-determined range of saturation and turns non-linear, indicating that the tire is at or near saturation, then the actual utilized longitudinal friction of the tire is used for the tire-road friction coefficient. The actual utilized longitudinal friction of the tire is used once the tire is within the pre-determined range of saturation because the correlation between the initial slope of the tire characteristic curve and the tire-road friction coefficient is no longer valid once the tire reaches saturation. The tire-road friction coefficient may therefore be accurately estimated when the tire is below saturation, as well as at saturation.

The above features and advantages and other features and advantages of the present invention are readily apparent from the following detailed description of the best modes for carrying out the invention when taken in connection with the accompanying drawings.

DETAILED DESCRIPTION

Figure 1:
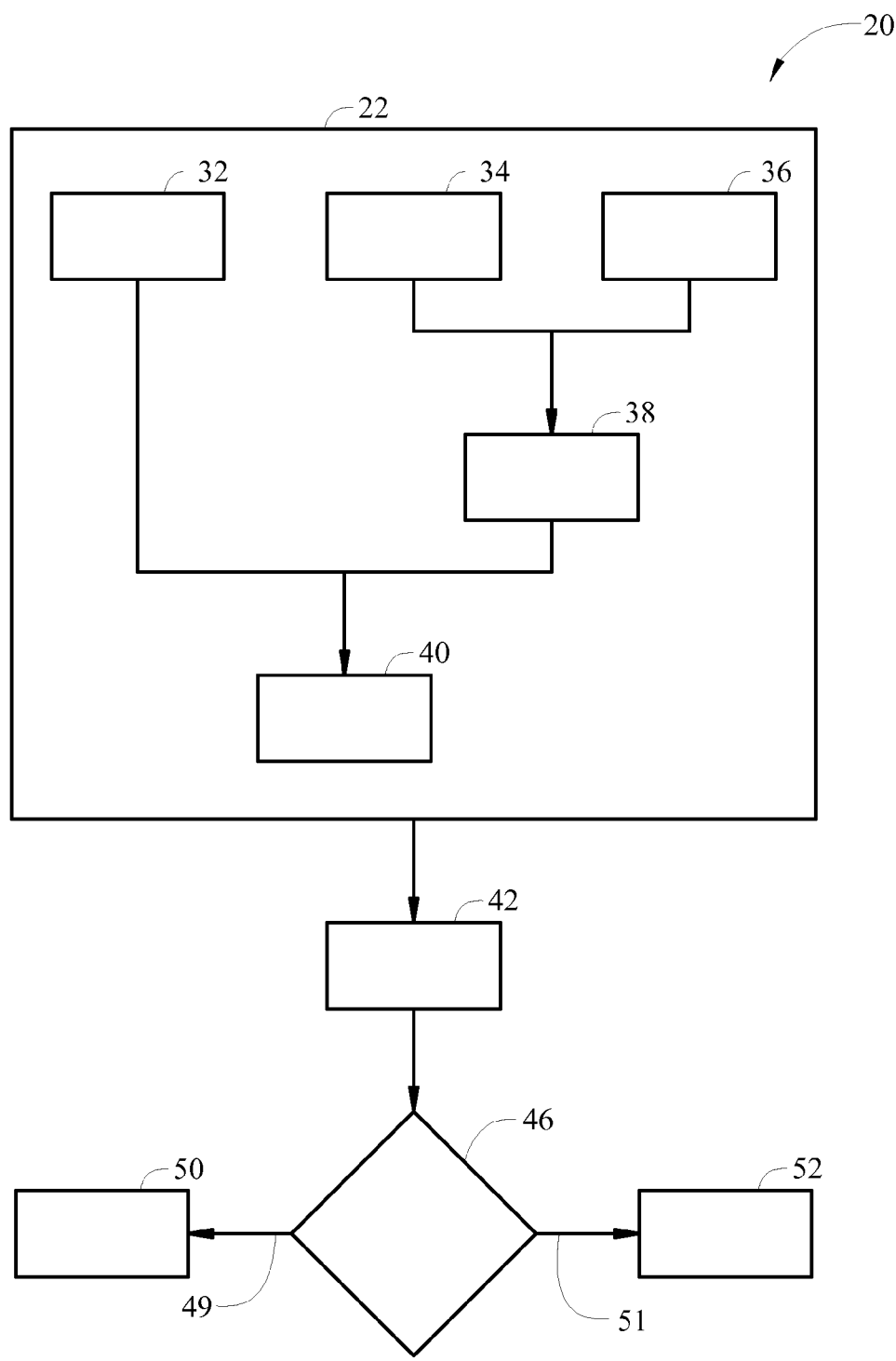
FIG. 1 is a flowchart showing a method of estimating a tire-road friction coefficient.

Referring to the Figures, wherein like numerals indicate like parts throughout the several views, a method of estimating a longitudinal tire-road friction coefficient for a vehicle is shown generally at 20 in FIG. 1. The tire-road friction coefficient is a dimensionless value indicating the friction qualities of the tire against the friction qualities of the road. When measured in a longitudinal direction of the vehicle, i.e., a direction extending between a front of the vehicle and a rear of the vehicle, the tire-road friction coefficient is referred to as the longitudinal tire-road friction coefficient. Once calculated, the longitudinal tire-road friction coefficient may be used by one or more control systems of the vehicle, including but not limited to an electronic stability control system or an anti-lock brake system, to determine how to control the vehicle under existing conditions. The tire-road friction coefficient is continuously changing with changing road and weather conditions, as well as changing vehicle operating conditions. Accordingly, the tire-road friction coefficient must be continuously calculated or estimated to provide the various control systems with the most precise and up to date estimate of the tire-road friction coefficient.

Figure 2:
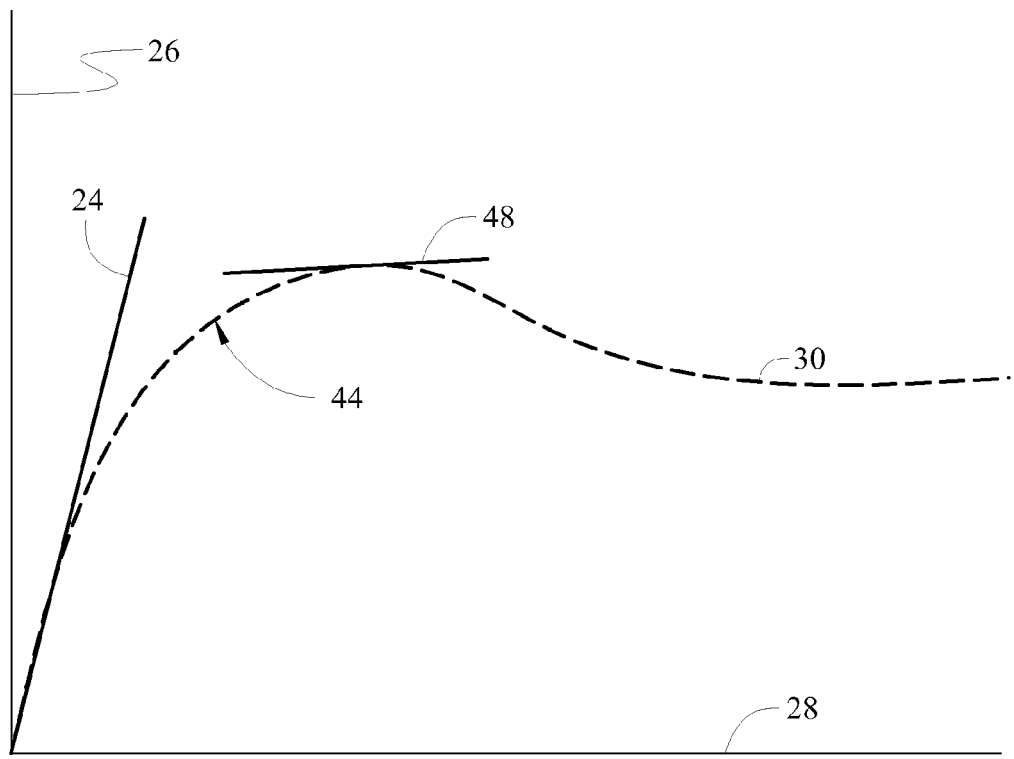
FIG. 2 is a graph relating a utilized longitudinal friction of a tire on a vertical axis against longitudinal slip of the tire on the horizontal axis.

The method includes estimating a longitudinal stiffness of the tire, generally indicated by block 22. Referring also to FIG. 2, the longitudinal stiffness of the tire is generally indicated by line 24 shown in FIG. 2. The longitudinal stiffness of the tire is defined as an initial slope, i.e., line 24, of a tire characteristic curve that relates a utilized longitudinal friction of the tire, measured along a vertical axis 26 shown in FIG. 2, to the longitudinal slip of the tire, measured along a horizontal axis 28 shown in FIG. 2. The tire characteristic curve 30 is generally indicated by the dashed line 30 shown in FIG. 2.

A noticeable difference exists in the slope of the tire characteristic curve 30 at low longitudinal slip values compared to the slope of the tire characteristic curve 30 at higher longitudinal slip values. In the low longitudinal slip region of the tire characteristic curve 30, there is a linear relationship, i.e., the initial slope 24. When the longitudinal slip increases, the slope of the tire characteristic curve 30 becomes non-linear 44 and flattens as the tire approaches saturation. Tire saturation is defined herein as the longitudinal tire force reaching a maximum value under present conditions. In the liner range 24 of the tire characteristic curve 30 at low longitudinal slip, a simple algorithm based upon the longitudinal acceleration of the vehicle, such as but not limited to algorithms used by an anti-lock braking system or a traction control system, may be used to calculate the longitudinal tire-road friction coefficient. However, these algorithms are not applicable once the tire nears saturation, i.e., the tire characteristic curve 30 enters the non-linear region 44 of the tire characteristic curve 30.

Estimating the longitudinal stiffness of the tire includes calculating a longitudinal slip of the tire over time, generally indicated by block 32. The longitudinal stiffness of the tire is continuously calculated on an intermittent basis. The longitudinal slip is continuously calculated to provide a series of values representing the longitudinal slip, and the change thereof, over time. For example, the longitudinal slip may be calculated once every pre-determined time period. The pre-determined time period may be defined as one second. Accordingly, the longitudinal slip may be calculated once every second. It should be appreciated that the frequency of the calculation of the longitudinal slip may differ from the example provided.

The longitudinal slip of the tire may be calculated, for example, by Equation 1:

$$k = -\frac{V_X - r_e \omega}{V_X} \quad\quad 1)$$

wherein k is the longitudinal slip of the tire, ω is an angular speed of revolution of the tire, $r_e$ is an effective rolling radius of the tire, and $V_X$ is a longitudinal speed of the vehicle. The angular speed of revolution ω of the tire may be measured using a standard anti-lock brake wheel speed sensor, and the longitudinal speed of the vehicle may be computed from the angular velocity of a non-driven wheel, from a longitudinal accelerometer, or from a GPS signal. It should be appreciated that the longitudinal slip of the tire may be calculated in some other manner not described herein.

Estimating the longitudinal stiffness of the tire further includes calculating a longitudinal force on the tire over time, generally indicated by block 34. The longitudinal force on the tire is continuously calculated on an intermittent basis. The longitudinal force on the tire is continuously calculated to provide a series of values representing the longitudinal force on the tire, and the change thereof, over time. For example, the longitudinal force on the tire may be calculated once every pre-determined time period. The pre-determined time period may be defined as one second. Accordingly, the longitudinal force on the tire may be calculated once every second. It should be appreciated that the frequency of the calculation of the longitudinal force on the tire may differ from the example provided.

Figure 3:
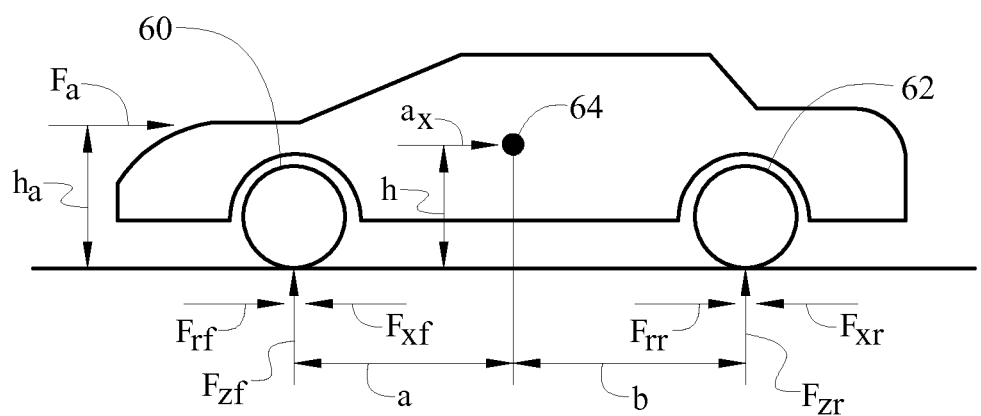
FIG. 3 is a schematic force diagram.

The longitudinal force on the tire may be based on an estimated or measured engine torque, or may alternatively be computed based on the longitudinal acceleration of the vehicle. The engine torque may be measured by one or more vehicle sensors, or may be estimated from a model. If an estimated or measured engine torque is used to estimate the longitudinal force on the tire, then a model of the drive train is referenced to transform the engine torque to the longitudinal force on the tire. Accordingly, the model correlates the engine torque to a value of the longitudinal force on the tire. If the longitudinal force on the tire is based on the longitudinal acceleration of the vehicle, as measured by one or more longitudinal accelerometers or other sensors of the vehicle, then the longitudinal force on the tire may be calculated during acceleration by Equation 2:

$$F_x = F_{xf} + F_{xr} = m|a_x| + |F_r| + |D_a V^2| \quad\quad 2)$$

and may be calculated during braking by Equation 3:

$$F_x = F_{xf} + F_{xr} = m|a_x| - |F_r| + |D_a V^2| \quad\quad 3)$$

wherein $F_X$ is the combined longitudinal force on a front tire 60 and a rear tire 62; $F_{xf}$ is the longitudinal force on the front tire 60; $F_{xr}$ is the longitudinal force on the rear tire 62; m is the mass of the vehicle; $a_x$ is the longitudinal acceleration of the vehicle; $F_r$ is the rolling resistance force on the tire; $D_a$ is the aerodynamic drag force; and V is the velocity of the vehicle. The rolling resistance force $F_r$ may be calculated from Equation 4:

$$F_r = C_{roll} mg \quad\quad 4)$$

wherein $C_{roll}$ is the rolling resistance coefficient; m is the mass of the vehicle; and g is the acceleration of gravity. The rolling resistance force includes a value for the front tire 60 $F_{rf}$ and a value for the rear tire 62 $F_{rr}$. The aerodynamic drag force $D_a$ may be calculated from equation 5:

$$D_a = \frac{1}{2}\rho C_d A \quad\quad 5)$$

wherein ρ is the air density; $C_d$ is the aerodynamic drag coefficient; and A is the frontal area of the vehicle. The various dynamic forces described above are shown relative to a vehicle in FIG. 3. It should be appreciated that the longitudinal force on the tire may be calculated in some other manner not described herein.

Estimating the longitudinal stiffness of the tire further includes calculating a vertical force on the tire over time, generally indicated by block 36. The vertical force on the tire is continuously calculated on an intermittent basis. The vertical force on the tire is continuously calculated to provide a series of values representing the vertical force on the tire, and the change thereof, over time. For example, the vertical force on the tire may be calculated once every pre-determined time period. The pre-determined time period may be defined as one second. Accordingly, the vertical force on the tire may be calculated once every second. It should be appreciated that the frequency of the calculation of the vertical force on the tire may differ from the example provided.

The vertical force on the tire may be calculated, for example, by Equation 4 when calculating the vertical force on a front tire 60, and by Equation 5 when calculating the vertical force on a rear tire 62. Equation 4 and Equation 5 are defined below as:

$$F_{zf} = \frac{mgb - m a_x h - D_a V^2 h^a}{(a+b)} \quad\quad 4)$$

$$F_{zr} = \frac{mgb + m a_x h + D_a V^2 h^a}{(a+b)} \quad\quad 5)$$

wherein $F_{zf}$ is the vertical force on the front tire 60; $F_{zr}$ is the vertical force on the rear tire 62; m is the mass of the vehicle; g is the acceleration of gravity; a is the distance from a center of gravity 64 of the vehicle to the front tire 60; b is the distance from the center of gravity 64 of the vehicle to the rear tire 62; $a_x$ is the longitudinal acceleration of the vehicle; $D_a$ is the aerodynamic drag force, and may be calculated using Equation 5 above; h is the height of the center of gravity 64 of the vehicle; V is the velocity of the vehicle; and $h^a$ is the height of the aerodynamic drag force. The various dynamic forces and dimensions described above are shown relative to the vehicle in FIG. 3. It should be appreciated that the vertical force may be calculated in some other manner not described herein.

Estimating the longitudinal stiffness of the tire further includes calculating a utilized longitudinal friction of the tire over time, generally indicated by block 38. The utilized longitudinal friction of the tire is continuously calculated on an intermittent basis. The utilized longitudinal friction is continuously calculated to provide a series of values representing the utilized longitudinal friction, and the change thereof, over time. For example, the utilized longitudinal friction may be calculated once every pre-determined time period. The pre-determined time period may be defined as one second. Accordingly, the utilized longitudinal friction may be calculated once every second. It should be appreciated that the frequency of the calculation of the utilized longitudinal friction may differ from the example provided.

The utilized longitudinal friction may be calculated, for example, by Equation 6, wherein the utilized longitudinal friction is calculated by dividing the longitudinal force on the tire by the vertical force on the tire at any given instant in time.

$$\mu_{util} = \frac{F_x}{F_z} \quad 6)$$

Accordingly, at any given instant in time, the longitudinal force on the tire is calculated as described above, the vertical force on the tire is calculated as described above, and then the longitudinal force on the tire is divided by the vertical force on the tire to calculate the utilized longitudinal friction at that specific instant in time. If the utilized longitudinal friction is calculated for the current time and conditions, e.g., a current operation point, then the utilized longitudinal friction may be referred to as the current utilized longitudinal friction.

When the tire is in the low slip region, i.e., the liner portion 24 of the tire characteristic curve 30 for a given road surface and normal force, the longitudinal force generated at a tire is proportional to the longitudinal slip of the tire at that operating point, i.e., at that point in time. This is defined as the longitudinal stiffness of the tire, which is the initial slope 24 of the tire characteristic curve 30.

Estimating the longitudinal stiffness of the tire further includes calculating the initial slope 24 of the tire characteristic curve 30, generally indicated by block 40. As noted above, the tire characteristic curve 30 relates the utilized longitudinal friction of the tire to the longitudinal slip of the tire over time. As shown in FIG. 2, the utilized longitudinal friction of the tire is plotted on the vertical axis 26, with the longitudinal slip plotted on the horizontal axis 28. Accordingly, the initial slope 24 of the tire characteristic curve 30 may be calculated by dividing the utilized longitudinal friction by the longitudinal slip.

Identifying the initial slope 24 of the tire characteristic curve 30 may include filtering the several calculated data points for the utilized longitudinal friction of the tire and the longitudinal slip of the tire, which represent the tire characteristic curve 30, to estimate a value of the initial slope 24. The data points may be filtered with, for example, a Kalman filter or some other estimation technique. By applying a Kalman filter technique, for example, it is possible to estimate the longitudinal tire stiffness based on the longitudinal slip and the longitudinal force on the tire. Based on experimental results, the estimated longitudinal tire stiffness may be correlated into a corresponding tire-road friction coefficient using, for example, a simple look-up table.

The method further includes defining a pre-determined range of saturation for the tire, generally indicated by block 42. As shown in FIG. 2, the tire characteristic curve 30 includes a generally linear initial slope 24. However, as the tire approaches saturation, the slope of the tire characteristic curve 30 turns non-linear. The non-linear portion of the tire characteristic curve 30 is generally shown at 44 in FIG. 2. The pre-determined range of saturation is a percentage or range of saturation of the tire. Accordingly, the tire may be considered saturated when it reaches the pre-determined range of saturation. The pre-determined range of saturation may be defined as occurring when the derivative of the tire characteristic curve 30 is equal to or near zero (0), thereby generally indicating that the utilized longitudinal friction is no longer increasing in value. Alternatively, the pre-determined range of saturation may be defined as some value short of but near zero. It should be appreciated that the pre-determined range of saturation may be defined to include any value or range of values specific to the tire, vehicle, and/or road conditions.

Because the longitudinal tire-road friction coefficient may only be calculated from the tire stiffness as described above when the tire stiffness is in the linear range, i.e., the initial slope 24 of the tire characteristic curve, the method further includes determining if the tire is within the pre-determined range of saturation, generally indicated by block 46. Determining if the tire is within the pre-determined range of saturation identifies if the tire is in the liner range 24 or non-linear range 44 of the tire characteristic curve 30. Determining if the tire is within the pre-determined range of saturation may include, for example, continuously monitoring the slope of the tire characteristic curve 30 over time to determine when the slope of the tire characteristic curve 30 falls within the pre-determined range of saturation. Continuously monitoring the slope of the tire characteristic curve 30 over time may include tracking a first derivative of the tire characteristic curve 30 over time to determine when the first derivative of the tire characteristic curve 30 reaches or approaches zero, or otherwise reaches or approaches the pre-determined range of saturation. The first derivative of the tire characteristic curve is generally indicated by line 48 shown in FIG. 2. Accordingly, the derivative of the utilized longitudinal friction may be divided by the derivative of the longitudinal slip of the tire to calculate a slope of the derivative of the tire characteristic curve 30. Several data points representing the slope of the derivative of the tire characteristic curve 30 may be developed over time. Accordingly, determining if the tire is within the pre-determined range of saturation may include filtering the first derivative of the tire characteristic curve 30 over time with a data point to estimate a value of the first derivative of the tire characteristic curve 30. Data points of the first derivative of the tire characteristic curve 30 may be filtered with, for example, a Kalman filter or some other estimation technique.

When the tire is not within the pre-determined range of saturation, generally indicated at 49, and is still within the initial linear range of the tire characteristic curve 30, then the method further includes correlating the longitudinal stiffness of the tire to an estimated value of the tire-road friction coefficient, generally indicated by block 50, to estimate the tire-road friction coefficient. The longitudinal stiffness of the tire may be correlated to an estimated value of the tire-road coefficient by referencing a look-up table that correlates the longitudinal stiffness of the tire, i.e., the initial slope 24 of the tire characteristic curve 30, to empirically derived values of the tire-road friction coefficient for the tire.

When the estimated slope of the operation point drops close to zero and the tire is within the pre-determined range of saturation, generally indicated at 51, then the method further includes calculating a current utilized longitudinal friction of the tire to estimate the tire-road friction coefficient, generally indicated by block 52. As described above, the current value of the longitudinal force on the tire at that specific instant in time is divided by the current vertical force on the tire at that specific instant in time to calculate the current utilized longitudinal friction. This calculated value of the current utilized longitudinal friction of the tire is then used as the estimate of the tire-road friction coefficient. As long as the estimated slope of the tire characteristic curve 30 includes a relatively large value, the range of operation is considered to be in the linear portion 24 of the tire characteristic curve and the tire-road friction coefficient may be calculated from the estimated tire stiffness as described above. When the estimated slope of the tire characteristic curve 30 falls within the pre-determined range of saturation, the range of operation is considered to be in the non-linear portion 44 of the tire characteristic curve, and the tire-road friction coefficient may be calculated using Equation 6 described above.

While the best modes for carrying out the invention have been described in detail, those familiar with the art to which this invention relates will recognize various alternative designs and embodiments for practicing the invention within the scope of the appended claims.

The invention claimed is:

1. A method of estimating a longitudinal tire-road friction coefficient for a vehicle, the method comprising:
   estimating a longitudinal stiffness of a tire;
   determining if the tire is within a pre-determined range of saturation;
   correlating the longitudinal stiffness of the tire to an estimated value of the tire-road friction coefficient to estimate the tire-road friction coefficient when the tire is not within the pre-determined range of saturation; and
   calculating a current utilized longitudinal friction of the tire to estimate the tire-road friction coefficient when the tire is within the pre-determined range of saturation.

2. A method as set forth in claim 1 wherein estimating the longitudinal stiffness of the tire includes intermittently calculating a longitudinal slip of the tire over time.

3. A method as set forth in claim 2 wherein estimating the longitudinal stiffness of the tire includes intermittently calculating a longitudinal force on the tire over time.

4. A method as set forth in claim 3 wherein calculating the longitudinal force on the tire includes referencing an engine torque to a correlated value of the longitudinal force on the tire.

5. A method as set forth in claim 4 wherein referencing an engine torque includes measuring an engine torque.

6. A method as set forth in claim 4 wherein referencing an engine torque includes estimating the engine torque from a model.

7. A method as set forth in claim 3 wherein calculating the longitudinal force on the tire includes calculating the longitudinal force on the tire from a longitudinal acceleration of the vehicle.

8. A method as set forth in claim 7 wherein referencing the longitudinal acceleration of the vehicle includes measuring the longitudinal acceleration of the vehicle.

9. A method as set forth in claim 3 wherein estimating the longitudinal stiffness of the tire includes intermittently calculating a vertical force on the tire over time.

10. A method as set forth in claim 9 wherein estimating the longitudinal stiffness of the tire includes intermittently calculating a utilized longitudinal friction of the tire over time.

11. A method as set forth in claim 10 wherein the utilized longitudinal friction is calculated by dividing the longitudinal force on the tire by the vertical force on the tire.

12. A method as set forth in claim 10 wherein estimating the longitudinal stiffness of the tire includes calculating an initial slope of a tire characteristic curve that relates the utilized longitudinal friction of the tire to the longitudinal slip of the tire over time.

13. A method as set forth in claim 12 wherein identifying the initial slope of the tire characteristic curve includes filtering the tire characteristic curve to estimate a value of the initial slope.

14. A method as set forth in claim 12 wherein determining if the tire is within the pre-determined range of saturation includes continuously monitoring the slope of the tire characteristic curve over time to determine when the slope of the tire characteristic curve falls within the pre-determined range of saturation.

15. A method as set forth in claim 14 wherein continuously monitoring the slope of the tire characteristic curve over time includes tracking a first derivative of the tire characteristic curve.

16. A method as set forth in claim 15 wherein determining if the tire is within the pre-determined range of saturation includes filtering the first derivative of the tire characteristic curve.

17. A method as set forth in claim 1 further comprising defining the pre-determined range of saturation for the tire.

18. A method as set forth in claim 1 wherein correlating the longitudinal stiffness of the tire to an estimated value of the tire-road coefficient includes referencing a look-up table correlating the longitudinal stiffness of the tire to empirically derived values of the tire-road friction coefficient for the tire.

19. A method as set forth in claim 1 wherein calculating a current utilized longitudinal friction of the tire to estimate the tire-road friction coefficient includes dividing a current longitudinal force on the tire by a current vertical force on the tire to calculate the current utilized tire-road friction coefficient.

* * * * *